(12) United States Patent
Krabbenhöft

(10) Patent No.: US 7,813,014 B2
(45) Date of Patent: Oct. 12, 2010

(54) METHOD OF ADAPTING A PRINTING PROCESS WHILE MAINTAINING BLACK BUILD-UP

(75) Inventor: Uwe-Jens Krabbenhöft, Landwehr (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1087 days.

(21) Appl. No.: 10/676,587

(22) Filed: Oct. 1, 2003

(65) Prior Publication Data
US 2004/0136018 A1    Jul. 15, 2004

(30) Foreign Application Priority Data
Jan. 10, 2003    (DE) ................................ 103 00 639

(51) Int. Cl.
*H04N 1/60* (2006.01)
*G03F 3/00* (2006.01)
*G09G 5/02* (2006.01)

(52) U.S. Cl. .................... 358/518; 358/1.9; 358/529

(58) Field of Classification Search ................. 358/1.9, 358/327, 515, 518, 521, 529, 2.1, 519, 520, 358/523; 345/589, 590, 591; 382/162, 167, 382/302
See application file for complete search history.

(56) References Cited

U.S. PATENT DOCUMENTS

| | | | | |
|---|---|---|---|---|
| 5,483,360 A | * | 1/1996 | Rolleston et al. | 358/518 |
| 5,719,956 A | * | 2/1998 | Ogatsu et al. | 382/167 |
| 5,774,238 A | * | 6/1998 | Tsukada | 358/529 |
| 6,108,442 A | | 8/2000 | Edge et al. | |
| 6,281,984 B1 | * | 8/2001 | Decker et al. | 358/1.9 |
| 6,362,808 B1 | * | 3/2002 | Edge et al. | 345/601 |
| 6,529,291 B1 | * | 3/2003 | Schweid et al. | 358/1.9 |
| 6,744,534 B1 | * | 6/2004 | Balasubramanian et al. | 358/1.9 |
| 6,775,030 B2 | * | 8/2004 | Krabbenhöft et al. | 358/1.9 |
| 6,891,649 B1 | * | 5/2005 | Kondo | 358/527 |
| 7,057,765 B1 | * | 6/2006 | Fischer et al. | 358/1.9 |
| 2002/0131063 A1 | | 9/2002 | Krabbenhoft et al. | |
| 2004/0061880 A1 | * | 4/2004 | Okuyama | 358/1.9 |

FOREIGN PATENT DOCUMENTS

| | | |
|---|---|---|
| DE | 698 04 795 T2 | 4/2000 |
| DE | 199 46 585 A1 | 4/2001 |

* cited by examiner

*Primary Examiner*—Mark K Zimmerman
*Assistant Examiner*—Peter L. Cheng
(74) *Attorney, Agent, or Firm*—Laurence A Greenberg; Werner H Stemer; Ralph E Locher

(57) ABSTRACT

A method of adapting color values, which have been produced for a first printing process to a second printing process, is performed so that the visual impressions of the colors in the two printing processes are identical. Starting from a first printing process adaptation U without maintaining the black build-up, which transforms the color values [C1,M1,Y1,K1] of the first printing process into color values [C2,M2,Y2, K2]$_U$ of the second printing process, and a second printing process adaptation V while maintaining the black build-up, which transforms the color values [C1,M1,Y1,K1] of the first printing process into color values [C2,M2,Y2,K2]$_V$ of the second printing process, a new printing process adaptation W is determined by weighted averaging of the transformed color values [C2,M2,Y2,K2]$_U$ and [C2,M2,Y2,K2]$_V$.

4 Claims, 5 Drawing Sheets

METHOD OF ADAPTING A PRINTING PROCESS WHILE MAINTAINING BLACK BUILD-UP

BACKGROUND OF THE INVENTION

Field of the Invention

The invention relates to the field of electronic reproduction technology and pertains to a method of adapting color values which have been produced for a first printing process to a second printing process, so that the visual impression of the colors in the two printing processes is identical.

In reproduction technology, printing originals for printed pages are produced which contain all the elements to be printed, such as text, graphics and images. In the case of electronic production of printing originals, these elements are present in the form of digital data. For an image, the data is produced, for example, by the image being scanned point by point and row by row in a scanner, each image point being broken down into color components and the color components being digitized. Images are normally broken down in a scanner into the color components red, green and blue [R,G,B], that is to say into the components of a three-dimensional color space. However, different color components are needed for color printing. In the case of four-color printing, these are the printing inks cyan, magenta, yellow and black [C,M,Y,K], that is to say the components of a four-dimensional color space. For this purpose, the image data from the RGB color space must be transformed into the CMYK color space of the printing process to be used.

Such color space transformations are needed in reproduction technology, since all devices and processes have specific restrictions and special features in the representation and reproduction of the colors, and all devices and processes have different such characteristics. Therefore, for different devices and processes, such as scanners, monitors, proof output devices, printing processes and so on, there are various color spaces, which in each case describe the color characteristics of the device or process optimally and are designated device dependent color spaces. In addition to the device dependent color spaces there are also device independent color spaces, which are based on the human perception characteristics of what is known as a standard observer. Such color spaces are, for example, the XYZ color space defined by the Commission Internationale d'Eclairage (CIE) standardization commission or the LAB color space derived from this, the LAB color space having become more widespread in the technology. If it is wished to know whether two colors are perceived as identical or different by the human eye, then the measurement of the XYZ or LAB color components is sufficient for this purpose. The LAB color components form a color space with a lightness axis [L] and two color axes [A,B], which can be imagined in the plane of a color circle through the center of which the lightness axis runs. The LAB color components are related to the XYZ color components via non-linear conversion equations.

A device or color-processing process can be characterized as regards color characteristics by all the possible value combinations of the associated device-dependent color space being assigned the LAB color components perceived by a human in the case of the colors produced by these value combinations. For a printing process, the various CMYK value combinations in each case produce a different printed color. Using a color measuring instrument, the LAB components of the printed colors can be determined and allocated to the CMYK value combinations. Such an allocation, which sets the device dependent colors produced by a device or process in a relationship with a device independent color space (XYZ or LAB) is also designated a color profile, in the case of a printing process, an output color profile. The definition and data formats for color profiles have been standardized by the ICC (International Color Consortium—Specification ICC.1: 1998-09). In an ICC color profile, the allocation of the color spaces in both directions is stored, for example the allocation LAB=f1(CMYK) and the inverted allocation CMYK=f2 (LAB). The allocation defined by a color profile can be implemented with the aid of a look-up table. If, for example, the CMYK color components of a printing process have to be allocated to the LAB color components, the look-up table must have one storage space for every possible value combination of the CMYK color components, in which storage space the associated LAB color components are stored. This simple allocation method has the disadvantage, however, that the look-up table can become very large. If each of the color components [C,M,Y,K] has been digitized with 8 bits, that is to say has $2^8$=256 density stages, there are $256^4$=4,294,967,296 possible value combinations of the CMYK color components. The look-up table must therefore have 4,294,967,296 storage cells each having a three-byte word length (in each case one byte for L,A,B). The look-up table therefore reaches a size of 12.3 gigabytes.

In order to reduce the size of the look-up table, therefore, a combination of look-up table and interpolation method is used for describing a color profile and for implementing a corresponding color space transformation. In the look-up table, it is not the allocations for all the possible value combinations of the CMYK color components that are stored but only those for a relatively coarse, regular grid of reference points in the CMYK color space. The grid is formed by only each kth value being taken as a grid point in each component direction. For k=16, therefore, in each component each 16th value from the 256 possible values is taken as a grid point. Accordingly, in each component direction, the grid has 256/16=16 grid points, that is to say, for the entire CMYK color space, 16×16×16×16=65,536 grid points. For each grid point, the associated components of the LAB color space are stored as reference points in the look-up table. For CMYK value combinations that lie between the grid points, the LAB values to be allocated are interpolated from the adjacent reference points. For the inverted allocation CMYK=f2(LAB), for example a grid of 16×16×16=4096 grid points is formed in the LAB color space and the associated CMYK values are stored as reference points in the look-up table.

The allocations given in the color profiles between device dependent color spaces and a device independent color space (for example LAB) can be used for the color space transformation between the device dependent color spaces, so that, for example, the color values [C1,M1,Y1,K1] of a first printing process can be converted into the color values [C2,M2,Y2,K2] of a second printing process in such a way that the second print, according to the visual impression, has the same colors as the first print. FIG. 1 shows a simple color space transformation for such a printing process adaptation according to the prior art in a block diagram. A first color space transformation 1 from the color values [C1,M1,Y1,K1] of the first printing process into LAB color values and a second color space transformation 2 from the LAB color values into the color values [C2,M2,Y2,K2] of the second printing process are carried out one after another. The two color space transformations 1 and 2 can also be combined to form an equivalent color space transformation 3, which allocates the color values [C1,M1,Y1,K1] and the color values [C2,M2,Y2,K2] directly to one another. Since, via the device independent intermediate LAB color space, the color values [C1, M1,Y1,K1] and [C2,M2,Y2,K2] which result in the same LAB color values are allocated to one another, the associated printing inks in the two printing processes are perceived as visually identical within the printing ink gamut.

However, one disadvantage with this method is that what is known as the black build-up of the first printing process is lost. Black build-up is understood to mean the composition of printed colors with regard to their proportion of the black printing ink K. In particular, the intention is that purely black colors, such as blocks of text, are built up only with the printing ink K, that is to say do not contain any CMY components. With the described method according to the prior art, it is not possible to achieve the situation where purely black colors which are built up only with the printing ink K in the first printing process are also built up only with the printing ink K in the second printing process. In general, on the basis of the visual equality, that is to say the same LAB values, mixed colors are allocated in the second printing process that, although they predominantly contain proportions of the printing ink K, also contain CMY components. Among other things, this leads to black texts and lines acquiring colored edges after the printing process adaptation if there are register errors in the printing press.

In the method according to the prior art, it is additionally not ensured that the brightness curve in the black or gray colors, as set in the first printing process, is reproduced correctly in the second printing process after the adaptation. The reason for this is that the associated black or gray colors of the second printing process contain additional CMY components and that the K component is formed in accordance with the brightness curve of the second printing process, which was set during the creation of the color profile of the second printing process.

A further disadvantage of the described method is that the black build-up of the first printing process is lost in the chromatic colors. Since, in the four-color printing system, the same color can be printed with many different CMYK value combinations, the system is many-valued and it is possible to choose whether gray colors and dark colors are to be printed with a higher proportion of the black printing ink K and correspondingly lower proportions of the colored printing inks [C,M,Y] or with a lower proportion of K and correspondingly higher proportions of [C,M,Y]. This decision is made with known methods such as under-color removal (UCR) or gray-component reduction (GCR). The decision which was made for the color values [C1,M1,Y1,K1] of the first printing process will not be transferred into the associated color values [C2,M2,Y2,K2] of the second printing process in accordance with the simple method of printing process adaptation described in FIG. 1. Instead, the associated color values [C2, M2,Y2,K2] are formed in accordance with the black build-up of the second printing process which was set during the creation of the color profile of the second printing process.

In Published, Non-Prosecuted German Patent Application DE 199 46 585 A1, a method for printing process adaptation is described in which the disadvantages of the simple adaptation according to FIG. 1 are avoided. By a special color space transformation, which is derived from the given color profiles of the two printing processes, both the visually perceived colors and the black build-up of the first printing process are maintained.

However, even the printing process adaptation described in DE 199 46 585 A1 has disadvantages in specific color ranges, in particular in dark color ranges. For example, the additional printing of 30% Y onto the overprinted proportions of 60% C and 60% M can lead to a lighter color, because of the surface gloss of the yellow printing ink, instead of to a darker color, as expected. As a result, the lightness does not have a monotonic course with regard to any increasing proportion of the yellow printing ink. Because of by an inversion required in the method of the relationship between two associated color components, the brightness curve has to be changed in such a way that it is given a monotonic course. As a result of this necessary change, errors are introduced which falsify the result of the printing process adaptation. For very dark colors there is additionally the danger that the maximum permitted area coverage sum, which lies in the range from 280% to 350% for offset printing, will be exceeded when overprinting the transformed color values [C2,M2,Y2,K2]. The area coverage sum is the sum of the color components CMYK to be printed. The maximum application of printing ink expressed in this must be limited, since excessively thick color layers no longer dry sufficiently quickly and tend to smearing and to relief formation. Many printing presses can also be damaged by an excessively high application of printing ink.

SUMMARY OF THE INVENTION

It is accordingly an object of the invention to provide a method of adapting a printing process while maintaining the black build-up that overcomes the above-mentioned disadvantages of the prior art methods of this general type, which operates on the basis of given color profiles for the two printing processes and the black build-up of the first printing process being maintained to a great extent without the maximum permitted area coverage sum being exceeded.

With the foregoing and other objects in view there is provided, in accordance with the invention, a method for producing a printing process adaptation with which color values of a first printing process are converted into color values of a second printing process so that black build-up of the first printing process is substantially transferred into the second printing process and visual impressions of printed colors in the first and second printing processes are substantially identical. The method includes performing a first printing process adaptation without maintaining the black build-up for transforming the color values of the first printing process into transformed color values of the second printing process. A second printing process adaptation is performed while maintaining the black build-up for transforming the color values of the first printing process into further transformed color values of the second printing process. A third printing process adaptation is performed for transforming the color values of the first printing process into additional transformed color values of the second printing process by performing a weighted averaging of the transformed color values of the first printing process adaptation and of the further transformed color values of the second printing process adaptation.

The method according to the invention for adapting a printing process from a first printing process to a second printing process achieves the object by combining a printing process adaptation without maintaining the black build-up and a printing process adaptation while maintaining the black build-up. For this purpose, the transformed color values [C2, M2,Y2,K2] of the two adaptations are combined by a weighting function whose magnitude is varied on the basis of the color values from the first printing process [C1,M1,Y1].

In accordance with an additional mode of the invention, there is the step of carrying out the weighted averaging with a weighting function f(C1,M1,Y1) derived from a proportion of chromatic printing inks in colors of the first printing process. Preferably a higher weighting factor is allocated to the colors of the first printing process with a high proportion of the chromatic printing inks, and a lower weighting factor is allocated to the colors with a low proportion of the chromatic printing inks.

Other features which are considered as characteristic for the invention are set forth in the appended claims.

Although the invention is illustrated and described herein as embodied in a method of adapting a printing process while maintaining the black build-up, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2A:
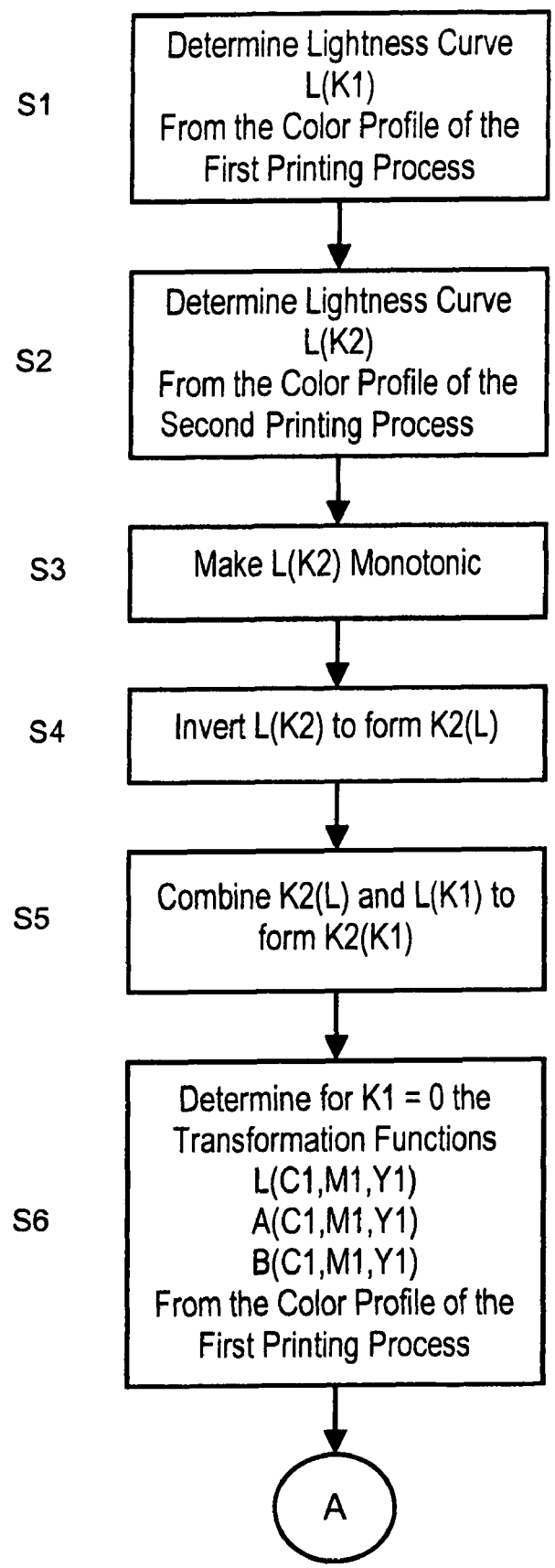
FIGS. 2A to 2C are flowcharts showing the production of a printing process adaptation while maintaining the black build-up according to the prior art.
Figure 2B:
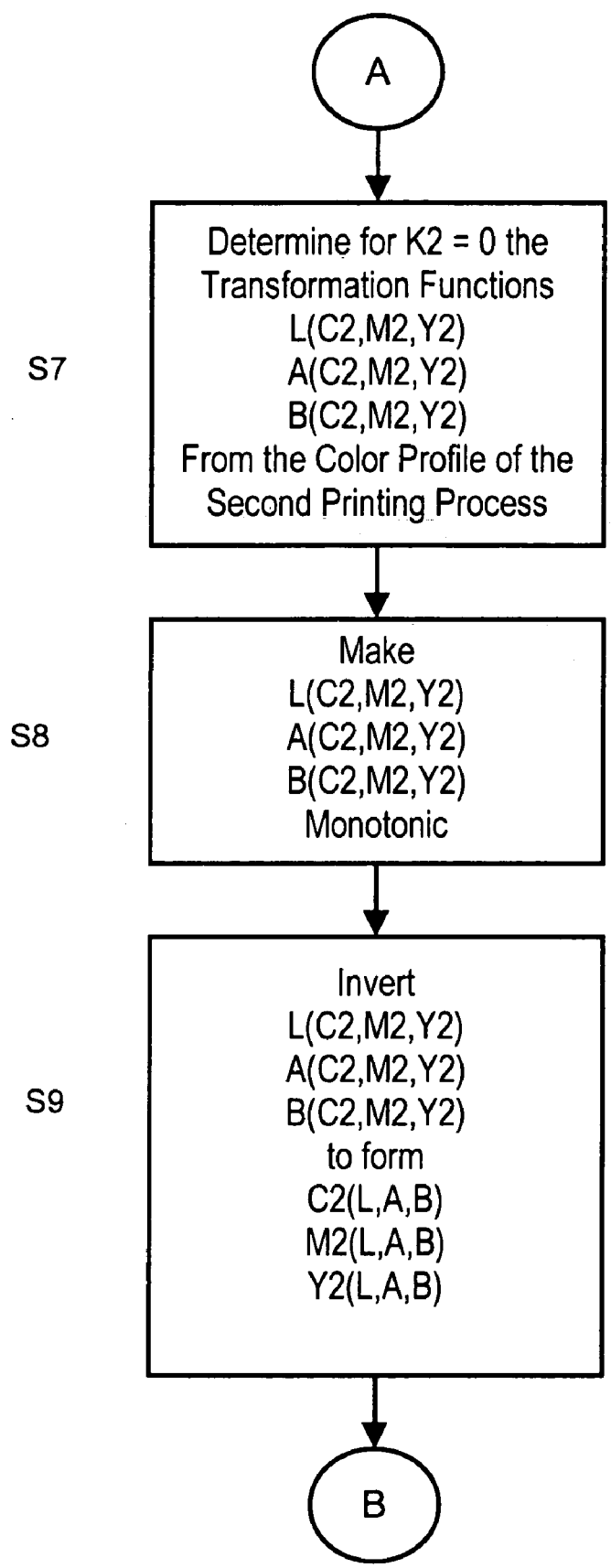
Figure 2C:
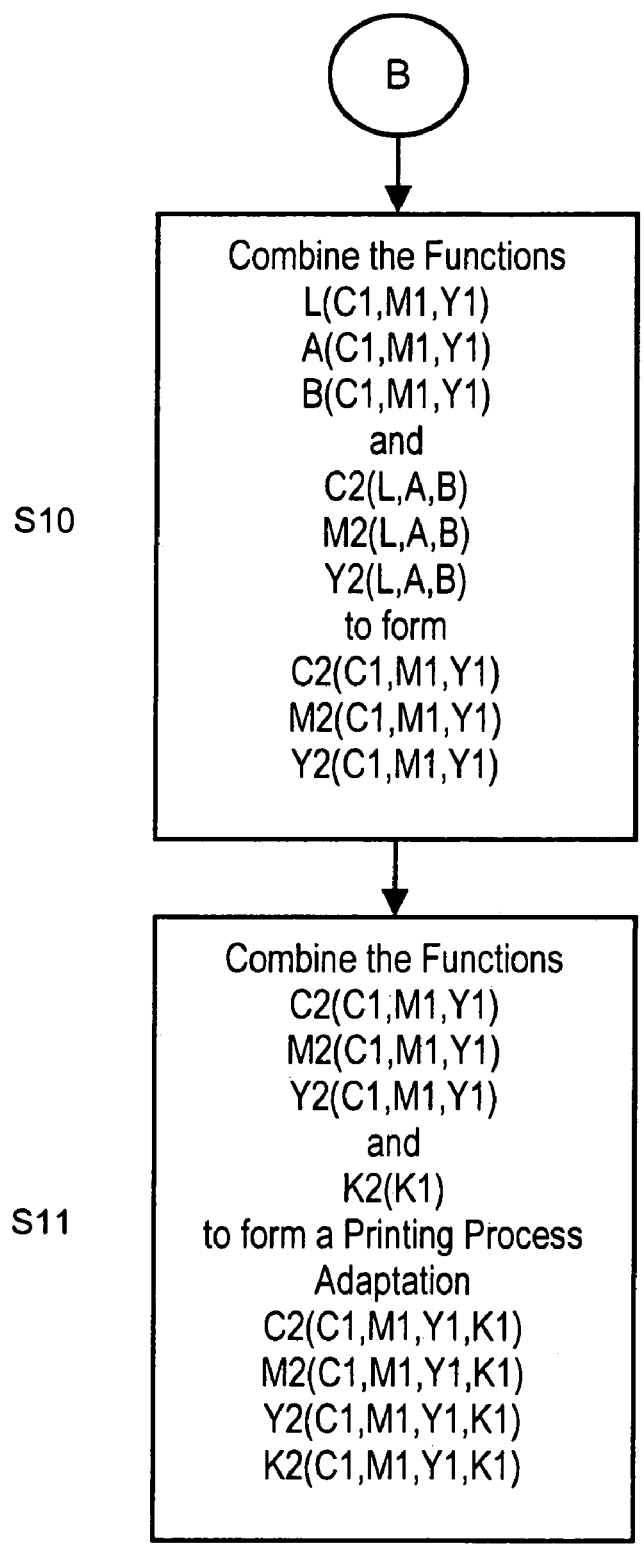

As prior art and as an example of adapting a printing process while maintaining the black build-up, the method described in Published, Non-Prosecuted German Patent Application DE 199 46 585 A1 will be explained. FIGS. 2A to 2C show the individual steps of the method in flowchart form. In step S1, a lightness curve is determined from a color profile of the first printing process as a function of color value K1, that is to say the function $L(K1)$. As explained at the beginning, the color profile specifies a relationship between the LAB color values and the color values [C1,M1,Y1,K1]. The lightness curve sought is obtained from this by setting C1=0, M1=0, and Y1=0 and varying the value K1. If the color values [C1,M1,Y1,K1] are each stored with 8 bits, for example, K1 is varied from 0 . . . 255. The L values resulting from this give the lightness curve $L(K1)$.

In step S2, in the same way, the lightness curve $L(K2)$ is determined from the color profile of the second printing process. The function $L(K2)$ generally has a monotonic course. If, however, it is not monotonic at some points, caused by computational inaccuracies or other influences, it is modified in step S3 in such a way that it is given a monotonic course, for example by leveling and smoothing "bulges" in the functional curve.

In step S4, the lightness curve $L(K2)$ is inverted, so that the function $K2(L)$ is obtained. Then, in step S5, the functions $L(K1)$ and $K2(L)$ are linked by "being connected in series", that is to say the function $$K2[L(K1)]=K2(K1) \quad (1)$$

is formed. The transformation function indicates, for purely black or gray colors, which color value K2 in the second printing process is to be used in order that the same visual lightness impression is produced as with the color value K1 in the first printing process. The associated color values K1 and K2 can, for example, be different, in spite of the same lightness impression, since in the two printing processes, black printing inks from different manufacturers are used or because the lightness of the printing material is different.

In step S6, the transformation functions $L(C1,M1,Y1)$ $A(C1,M1,Y1)$ $$B(C1,M1,Y1) \quad (2)$$

are determined from the color profile of the first printing process. For this purpose, K1=0 is set and the color components C1, M1 and Y1 are varied in their value range, for example C1=0 . . . 255, M1=0 . . . 0.255, Y1=0 . . . 0.255. For all the possible value combinations of [C1,M1,Y1], the associated LAB color values then result from the color profile, that is to say the above transformation functions.

In step S7, the corresponding transformation functions $L(C2,M2,Y2)$ $A(C2,M2,Y2)$ $$B(C2,M2,Y2) \quad (3)$$

are determined in the same way from the color profile of the second printing process. The functions generally have a monotonic course. However, if they are not monotonic at some points, they are modified in step S8 in such a way that they are given a monotonic course. This is done in an analogous way to that which was explained for step S3. As distinct from step S3, however, it is not just a curve which is to be smoothed but areas over the three independent variables [C2, M2,Y2].

In step S9, the system of functions of the equations (3) is then inverted, so that the functions $C2(L,A,B)$ $M2(L,A,B)$ $$Y2(L,A,B) \quad (4)$$

are obtained. Then, in step S10, these functions are linked with the transformation functions (according to the equations (2)) obtained in step S6 by "being connected in series", that is to say the functions $C2(C1,M1,Y1)$ $M2(C1,M1,Y1)$ $$Y2(C1,M1,Y1) \quad (5)$$

are formed. These functions indicate for pure colors, that is to say for colors without a black component, which color values [C2,M2,Y2] are to be used in the second printing process in order that the same visual color and lightness impression is produced as with the color values [C1,M1,Y1] in the first printing process.

In step S11, finally, the transformation functions obtained in step S10 for pure colors according to equations (5) and the transformation function obtained in step S5 for pure black or gray colors according to equation (1) are combined to form a four-dimensional transformation $C2(C1,M1,Y1,K1)$ $M2(C1,M1,Y1,K1)$ $$Y2(C1,M1,Y1,K1)$$

$$K2(C1,M1,Y1,K1) \qquad (6)$$

with which, in relation to each combination of color values [C1,M1,Y1,K1] given for the first printing process, a corresponding combination of color values [C2,M2,Y2,K2] can be determined for the second printing process. The four-dimensional transformation is the printing process adaptation sought while maintaining the black build-up.

If the printing process adaptation is to be created, for example, in the form of a look-up table with 16×16×16×16 reference values, the transformation functions for pure colors (equations (5)) and the transformation function for purely black or gray colors (equation (1)) can be combined in the following way. Each of the 16×16×16×16 look-up table locations corresponds to a value combination [C1,M1,Y1,K1] which will be designated an "address" in the following text. In this case, each of the four components can assume 16 discrete values. Value combinations [C2,M2,Y2,K2], which are referred to as "function values" below, are to be stored in each look-up table location. First, for all the addresses, in accordance with equations (5), the associated function values [C2,M2,Y2] are written into the look-up table. In this case, the address component K1 plays no part, that is to say it can assume any of the possible 16 values. All the addresses with a specific combination of address components [C1,M1,Y1] are given the function values [C2,M2,Y2] assigned in accordance with the equations (5). Then, the associated function value K2 is written into all the addresses in accordance with the equation (1). In this case, the address components [C1,M1,Y1] do not play any part, that is to say they can assume any of the possible 16×16×16 combinations. All the addresses with a specific address component K1 are given the function value K2-assigned in accordance with equation (1). In this case, the function values [C2,M2,Y2] previously written in are not changed.

The quality of the printing process adaptation obtained in this way while maintaining the black build-up can be checked in that, for one address [C1,M1,Y1,K1] the color values [L1,A1,B1] are determined from the color profile of the first printing process, and, for the function values [C2,M2,Y2,K2] assigned to the address, the color values [L2,A2,B2] are determined from the color profile of the second printing process. For optimal printing process adaptation, these LAB color values of the first and second printing process should agree for all the mutually associated CMYK colors. Differences which are established can subsequently still be reduced by an iterative compensation method, the associated function values [C2,M2,Y2,K2] being varied in small steps so that the LAB color values agree better.

Figure 1:
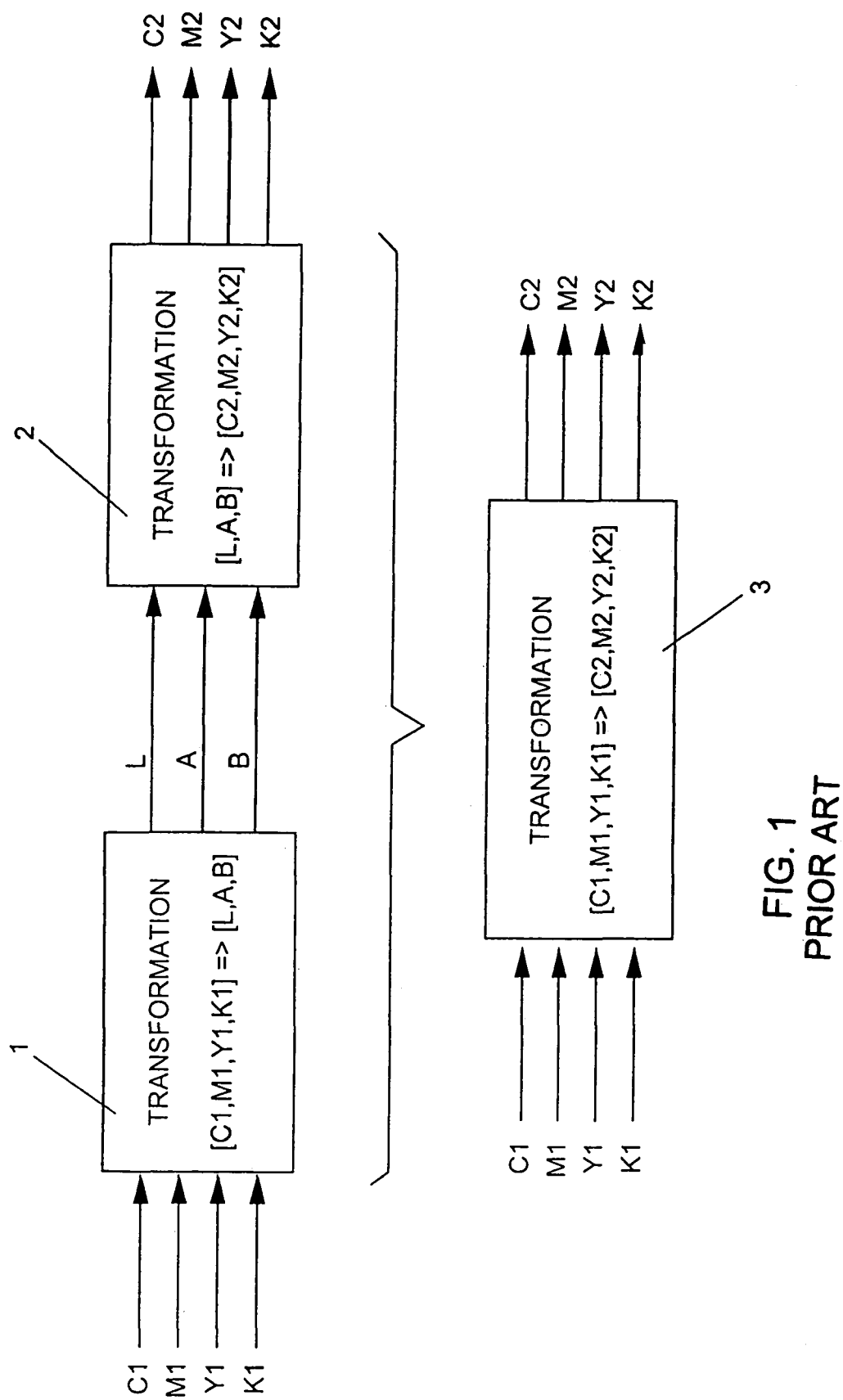
FIG. 1 is a block diagram for a printing process adaptation without maintaining the black build-up according to the prior art.

The method according to the invention for adapting a printing process from one printing process to another printing process starts from the prior art described and combines a first printing process adaptation U without maintaining the black build-up, as explained by using FIG. 1, for example, and a second printing process adaptation V maintaining the black build-up, as explained by using FIGS. 2A-2C, for example, in order to produce an improved third printing process adaptation W, which maintains the black build-up and at the same time limits the area coverage sum to a permissible extent. The transformed color values [C2,M2,Y2,K2] from the printing process adaptations U, V and W are distinguished in the following text by the indices U, V and W.

$$\text{Adaptation U: } [C1,M1,Y1,K1] \Rightarrow [C2,M2,Y2,K2]_U$$

$$\text{Adaptation V: } [C1,M1,Y1,K1] \Rightarrow [C2,M2,Y2,K2]_V \qquad (7)$$

$$\text{Adaptation W: } [C1,M1,Y1,K1] \Rightarrow [C2,M2,Y2,K2]_W$$

The improved printing process adaptation W is intended to have the characteristic that colors from the first printing process which contain relatively small proportions of the chromatic printing inks CMY are transformed in accordance with the printing process adaptation V substantially while maintaining the black build-up, and that colors from the first printing process which contain relatively high proportions of the chromatic printing inks CMY are transformed in accordance with the printing process adaptation U substantially without maintaining the black build-up. For colors that lie between these extremes, a gradual transition between the adaptation V while maintaining the black build-up and the adaptation U without maintaining the black build-up is to be created.

For this purpose, first a measure s(C1,M1,Y1) of the entire proportion of the chromatic printing inks CMY in a color from the first printing process is formed, for example the function:

$$s(C1,M1,Y1) = C1 \times C1 + M1 \times M1 + Y1 \times Y1 \qquad (8)$$

The maximum value of this function is:

$$s_{max} = s(100,100,100) = 30{,}000 \qquad (9)$$

Using the function s(C1,M1,Y1), a weighting function f(C1,M1,Y1) is formed, which is limited to the value range between 0 and 1, for example:

$$f(C1,M1,Y1) = \min\{s(C1,M1,Y1)/(T \times s_{max}); 1\} \qquad (10)$$

Figure 3:
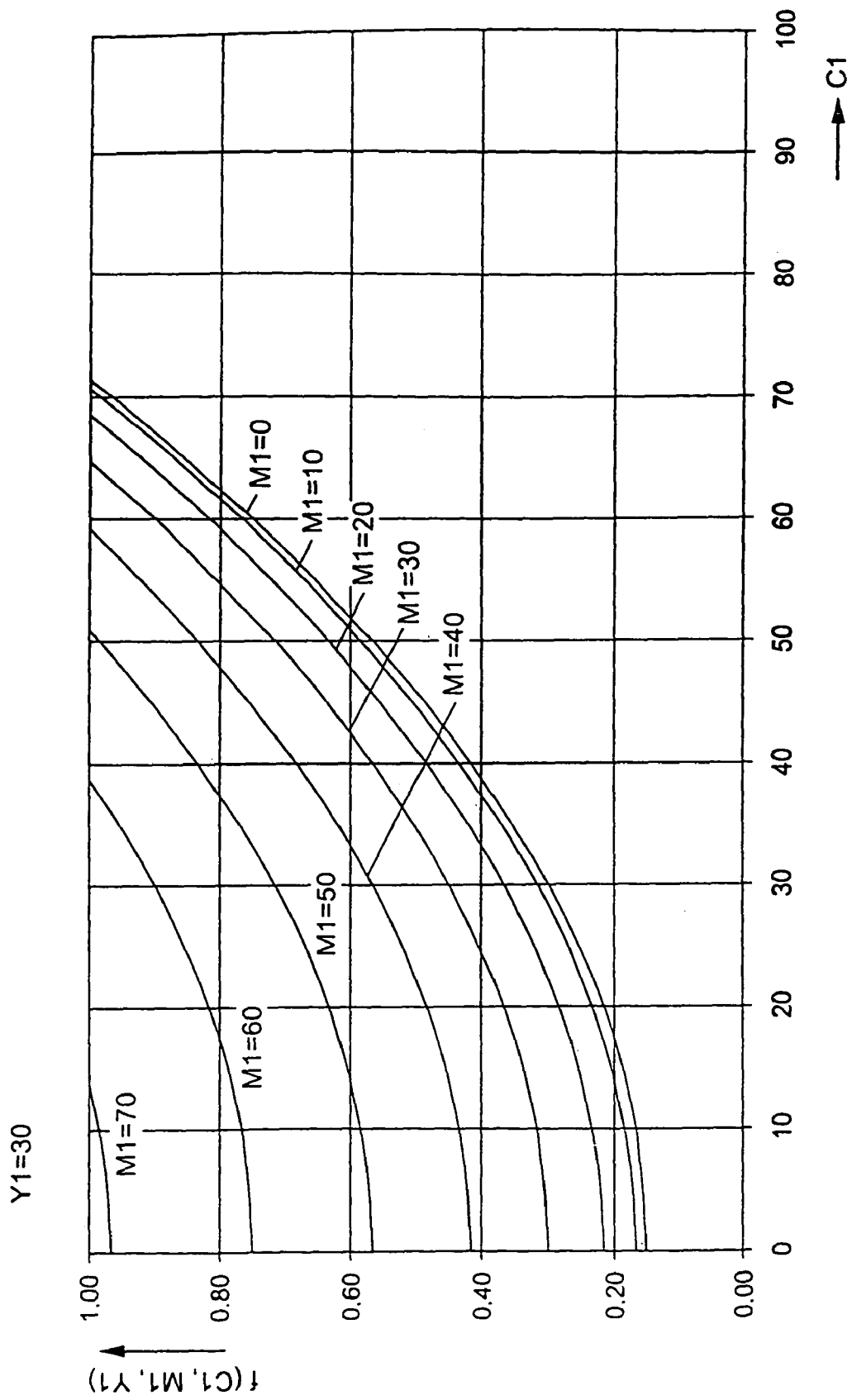
FIG. 3 is a graph showing the course of a weighting function according to the invention.

Using the factor T, it is possible to determine at which chromatic color proportion s the limitation to 1 begins. A preferred value for T is T=0.2. FIG. 3 shows the course of the weighting function f(C1,M1,Y1) as a function of C1 and M1 for a value of Y1=30%.

The improved printing process adaptation W according to the invention is then determined as a weighted averaging of the color values [C2,M2,Y2,K2] of the printing process adaptations U and V.

$$[C2]_W = f \times [C2]_U + (1-f) \times [C2]_V$$

$$[M2]_W = f \times [M2]_U + (1-f) \times [M2]_V$$

$$[Y2]_W = f \times [Y2]_U + (1-f) \times [Y2]_V$$

$$[K2]_W = f \times [K2]_U + (1-f) \times [K2]_V \qquad (11)$$

In addition to the weighting function f(C1,M1,Y1) proposed here, other weighting functions can of course also be used which have the characteristic that they allocate a high weighting factor to the colors from the first printing process with a high proportion of the chromatic printing inks [C1,M1,Y1] and a low weighting factor to the colors with a low proportion of the chromatic printing inks CMY.

I claim:

1. A method for producing a printing process adaptation with which color values of a first printing process are converted into color values of a second printing process so that black build-up of the first printing process being substantially transferred into the second printing process and visual impressions of printed colors in the first and second printing processes being substantially identical, which comprises the steps of:

performing a first printing process adaptation without maintaining the black build-up for transforming all the color values of the first printing process into transformed color values of the second printing process;

performing a second printing process adaptation while maintaining the black build-up for transforming all the color values of the first printing process into further transformed color values of the second printing process;

performing a third printing process adaptation for transforming all the color values of the first printing process into additional transformed color values of the second printing process by performing a weighted averaging of the transformed color values of the first printing process adaptation and of the further transformed color values of the second printing process adaptation;

carrying out the weighted averaging with a weighting function $f(C1,M1,Y1)$ derived from a proportion of chromatic printing inks CMY in colors of the first printing process;

using a function $s(C1,M1,Y1)$ for forming the weighting function $f(C1,M1,Y1)$, which is limited to a value range between 0 and 1, the function $s(C1,M1,Y1)$ being a measure of an entire proportion of the chromatic printing inks CMY in a color of the first printing process; and defining the function $s(C1,M1,Y1)$ by $s(C1,M1,Y1)=C1\times C1+M1\times M1+Y1\times Y1$.

2. A method for producing a printing process adaptation with which color values of a first printing process are converted into color values of a second printing process so that black build-up of the first printing process being substantially transferred into the second printing process and visual impressions of printed colors in the first and second printing processes being substantially identical, which comprises the steps of:

performing a first printing process adaptation without maintaining the black build-up for transforming all the color values of the first printing process into transformed color values of the second printing process;

performing a second printing process adaptation while maintaining the black build-up for transforming all the color values of the first printing process into further transformed color values of the second printing process;

performing a third printing process adaptation for transforming all the color values of the first printing process into additional transformed color values of the second printing process by performing a weighted averaging of the transformed color values of the first printing process adaptation and of the further transformed color values of the second printing process adaptation;

carrying out the weighted averaging with a weighting function $f(C1,M1,Y1)$ derived from a proportion of chromatic printing inks CMY in colors of the first printing process;

using a function $s(C1,M1,Y1)$ for forming the weighting function $f(C1,M1,Y1)$, which is limited to a value range between 0 and 1, the function $s(C1,M1,Y1)$ being a measure of an entire proportion of the chromatic printing inks CMY in a color of the first printing process; and defining the weighting function $f(C1,M1,Y1)$ by $f(C1,M1,Y1)=\min\{s(C1,M1,Y1)/(T\times smax); 1\}$, where smax is the maximum value of the function $s(C1,M1,Y1)$.

3. The method according to claim 2, which further comprises:

using a limiting factor T for determining at which chromatic color proportion $s(C1,M1,Y1)$ solely the first printing process adaptation is used as the third printing process adaptation.

4. The method according to claim 3, which further comprises:

determining a value of $T=0.2$ as a limiting factor.

* * * * *